United States Patent Office 3,361,752
Patented Jan. 2, 1968

3,361,752
PREPARATION OF BENZOTHIAZOLYL
DITHIO CARBAMATES
John J. D'Amico, Dunbar, W. Va., assignor to Monsanto
Company, St. Louis, Mo., a corporation of Delaware
No Drawing. Filed Oct. 2, 1964, Ser. No. 401,249
5 Claims. (Cl. 260—293.4)

The invention relates to an improved process for the synthesis of certain thioethers. More particularly, it deals with the improvement in reaction of certain mercaptans whereby an organic substituent becomes linked to the sulfur atom of the mercaptan. Suitable reactants are (1) salts of mercaptans which mercaptans have the formula

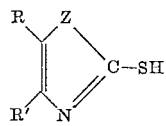

where Z is S, NH or O; R is hydrogen, $CONH_2$,

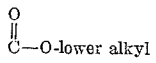

where the lower alkyl is for example methyl, ethyl, propyl, isopropyl, butyl or amyl,

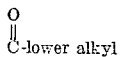

where the alkyl is for example methyl, ethyl, propyl, isopropyl, butyl or amyl or lower alkyl for example methyl, ethyl, propyl, butyl or amyl and $R^1$ is hydrogen or lower alkyl; and R and R' taken together with the vicinal carbon atoms constitute a closed ring of benzene, aniline, nitrobenzene, monoloweralkylbenzene or monoloweralkoxybenzene (the alkyl of the alkylbenzene and alkoxybenzene may be for example methyl, ethyl, propyl, isopropyl, butyl or amyl) and (2) salts of mercaptans which mercaptans have the formula

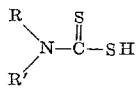

where R and R' are lower alkyl such as methyl, ethyl, propyl, isopropyl, butyl or amyl and R and R' taken together are radicals which with the nitrogen constitute a heterocyclic ring for example morpholino, pyrrolidinyl, piperidino or 1-hexahydroazepinyl. These salts of mercaptans are reacted either with 2-chlorothiazoles represented by the Formula 1 having the SH replaced by chlorine or with orthonitrochlorobenzene. The sodium or potassium salts of mercaptans are the preferred salts for the reaction, however the ammonium, zinc, magnesium, lead, silver or mercury salts are acceptable as well as amine addition salts. Typical suitable amines are trimethylamine, triethylamine, tripropylamine, triethanolamine, dimethyl cyclohexylamine, dimethyl aniline and pyridine. In the case of dithiocarbamates it is convenient to use the amine from which the dithiocarbamic acid is formed.

The synthesis of thioethers from chlorothiazoles or orthonitrochlorobenzene and mercaptans or salts of mercaptans presented a problem in the past. Generally, if a chemical reaction was accomplished with these reagents, the yield of a thioether product was low. The fact that the chlorine atom orthonitrochlorobenzene is not very reactive with mercaptans partly explains the poor results. Also, mercaptothiazoles and dithiocarbamic acids are weak acids, mercaptobenzothiazole being an especially weak acid. This weak acidity lends further explanation to the sluggish reaction.

An object of the invention is to provide an improved process for making thioethers. Among the specific objects tion of 2,2'-thiobis(benzothiazole), 2-benzothiazolyl diethyldithiocarbamate, 2 - benzothiazolyl - 1 - hexahydroazepinylcarbodithioate, 2-(orthonitrophenylthio)(benzothiazole) and similar compounds.

A further object of the invention is to provide an improved method for the commercial production of the compounds named, supra.

A further object of the invention is to provide an improved method for the commercial production of the compounds named, supra, at low temperatures in a reaction medium at atmospheric pressure.

A further object of the invention is to provide an improved method for the commercial production of the compounds named, supra, in comparatively high yields.

These objects are accomplished by using dimethylformamide (hereinafter called DMF) or other di lower alkyl amides of lower fatty acids, N-methyl-2-pyrrolidone, hexamethylphosphoramide or dimethylsulfoxide as the reaction medium in preparing the compounds named, supra.

The effect of amides or dimethylsulfoxide in reactions with salts is surprising. In the past the highest yields were obtained from reacting free mercaptobenzothiazole in an organic solvent and reaction with a salt produced a different product. The synthesis of 2,2'-thiobis(benzothiazole) from 2-mercaptobenzothiazole or its salt and 2-chlorobenzothiazole is reported by Teppema, U.S. Patent 2,028,-082. The best yield of 2,2'-thiobis(benzothiazole) reported by Teppema is 84%. The reactants in this synthesis are 2-mercaptobenzothiazole and 2-chlorobenzothiazole and the reaction is carried out in alcohol. However, this reaction is considered impractical because the reaction conditions required to obtain the 84% yield are three days at room temperature. When this reaction is re-investigated by heating these same reactants in a solvent of isopropyl alcohol at reflux, an equilibrium mixture results within minutes. After refluxing the equilibrium mixture for five hours, a yield of 56% 2,2'-thiobis (benzothiazole) is obtained. Teppema also reports an excellent yield of a compound melting at 145° C. from the reaction of sodium 2-mercaptobenzothiazole and 2-chlorobenzothiazole in a sealed tube. It is now known that the product from this reaction is not 2,2'-thiobis(benzothiazole) but its isomer, 3-(2-benzothiazolyl)-2-benzothiazolinethione.

The chlorothiazoles resemble aliphatic halides in reactivity and would be expected to react with DMF. It is shown in Coppinger's work reported in 76 Journal of American Chemical Society, 1372 (1954) that benzyl chloride reacts with DMF at 150° C. to produce dimethylbenzylamine and methyldibenzylamine. As one would expect, the reaction of 2-mercaptobenzothiazole and 2-chlorobenzothiazole in a medium of DMF at a temperature between 150° C. and 160° C. for five hours gives 2-(dimethylamino) - benzothiazole as the major product. Vapor phase chromatographic analysis of this product shows 77.7 weight percent 2-(dimethylamino)benzothiazole and only 22.3 weight percent 2,2'-thiobis-(benzothiazole). A lower reaction temperature of 80° C. to 90° C. for five hours in DMF gives 2,2'-thiobis(benzothiazole) as the sole product but the yield is only 54% and 24 hours is required to raise the yield to 77%. Increasing the mole ratio of 2-chlorobenzothiazole to 2 moles per mole of 2- and attempts to increase the rate by increasing the reacing this mixture at 80° C. to 90° C. for five hours lowers the yield of 2,2'-thiobis(benzothiazole) to 68.5%. Repeating the reaction with the same mole ratio but increasing the reaction temperature to 150° C. to 160° C. gives 2-(dimethylamino)-benzothiazole as the sole product in a 95.5% yield according to vapor phase chromatographic analysis. Thus, reaction in DMF is slower than in alcohol, and attempts to increase the rate by increasing the reaction temperature merely increases the side reactions with DMF.

I have discovered that quantitative yields of 2,2'-thiobis-(benzothiazole) are easily obtained by reacting the salts of 2-mercaptobenzothiazole with 2-chlorobenzothiazole in a medium of DMF or dimethylsulfoxide. A study of the kinetics of the reaction of sodium mercaptobenothiazole with 2-chlorobenzothiazole establishes that prior ionization of the latter is not involved. Instead, the reaction is a one-step substitution reaction involving a transition state. Ordinarily these reactions are not benefitted by strongly polar solvents. However, Campbell in 29 The Journal of Organic Chemistry 1830 (1964) suggests amide participation in the reaction to explain the utility of the amides in reactions of aromatic chlorides with thiolates. At a reaction temperature of about 150° C. or about 160° C., the reaction time for reacting sodium mercaptobenzothiazole and chlorobenzothiazole is short (about five hours) and 2,2'-thiobis(benzothiazole) with a melting point of 101° C.–102° C. is produced in quantitative yields and is the sole product since DMF does not react with the chlorobenzothiazole when the alkali metal salt is present.

To illustrate this part of my invention, five attempts to prepare 2,2'-thiobis(benzothiazole) are described, one in ethyl alcohol, one in octyl alcohol, two in DMF and one in dimethylsulfoxide. For the first preparation of 2,2'-thiobis(benzothiazole) in DMF a stirred mixture containing 56.7 grams (0.3 mole) of sodium 2-mercaptobenzothiazole, 49.9 grams (29 mole) of 2-chlorobenzothiazole and 300 ml. of DMF is heated at 140° C. to 150° C. for five hours. After cooling to 25° C., the reaction mixture is added to 1000 grams of ice water containing 48 grams (0.3 mole) of 25% aqueous sodium hydroxide and this mixture is stirred at 0° C. to 10° C. for one hour. The solid product is filtered, washed with water until neutral to litmus and dried at 45° C. The product is obtained in a 99% yield. A sample of the product melts at 99° C.–100° C. A sample of this 2,2'-thiobis(benzothiazole) recrystallized from ethyl alcohol melts at 101° C.–102° C. Vapor phase chromatographic analysis of the crude and recrystallized 2,2'-thiobis(benzothiazole) shows only one peak. A mixture melting with an authentic sample is not depressed and the infrared spectra of the two are superimposable. Analysis gives 9.27% nitrogen and 32.39% sulfur as compared to 9.33% nitrogen and 32.02% sulfur calculated for $C_{14}H_8N_2S_3$. Replacing DMF with octyl alcohol and heating for five hours at 130° C. to 140° C. reduces the yield about 34%. However, when the same reaction is carried out in dimethylsulfoxide, a 99% yield of 2,2'-thiobis(benzothiazole) with a melting point of 99° C.–100° C. is again obtained and a sample of this product recrystallized from ethyl alcohol melts at 101° C.–102° C. Analysis gives 9.35% nitrogen and 32.22% sulfur as compared to 9.33% nitrogen and 32.02% sulfur calculated for $C_{14}H_8N_2S_3$.

The second preparation of 2,2'-thiobis(benzothiazole) in DMF is identical to the first except the reaction temperature is 80° C. to 90° C. A 65% yield of product is obtained from this reaction. A sample of the product melts at 95° C.–97° C. A sample of this recrystallized 2,2'-thiobis(benzothiazole) melts at 101° C.–102° C. Analysis gives 9.16% nitrogen and 31.90% sulfur as compared to 9.33% nitrogen and 32.02% sulfur calculated for $C_{14}H_8N_2S_3$. A mixture melting point of the 2,2'-thiobis-(benzothiazole) obtained from the two preparations in DMF shows no depression and the infrared spectra of the two products are superimposable. However, replacing DMF with ethyl alcohol fails to produce any 2,2'-thiobis-(benzothiazole) under these conditions. For the ethyl alcohol solvent reaction, 42.4 grams (0.25 mole) of 2-chlorobenzothiazole is added in one portion to a stirred solution containing 46.6 grams (0.275 mole) of 99% 2-mercaptobenzothiazole, 18.3 grams (0.275 mole) of 85% potassium hydroxide and 300 ml. of ethyl alcohol. The stirred reaction mixture is heated at 78° C. to 80° C. for five hours. After cooling to 10° C., 600 ml. of water containing 48 grams (0.3 mole) of 25% aqueous sodium hydroxide is added to the mixture. The mixture is stirred at 0° C. to 10° C. for one hour. No precipitate results so the oily reaction mixture is extracted with 600 ml. of ether. The separated top ether layer is washed with water and dried. The ether is removed in vacuo and 42 grams or 99.5% of the reactant 2-chlorobenzothiazole is recovered unreacted. Ninety-five per cent of the reactant 2-mercaptobenzothiazole is recovered unreacted. Thus, the reactants, an alkali metal salt of 2-mercaptobenzothiazole and 2-chlorobenzothiazole, do not produce a scintilla of the desired product when refluxed in ethyl alcohol but yield 99% 2,2'-thiobis(benzothiazole) when refluxed in DMF.

Results comparable to the DMF and dimethylsulfoxide preparations of 2,2'-thiobis(benzothiazole) are obtained using diethylformamide, dipropylformamide, dibutylformamide, N,N - dimethylbutyramide, N - methyl - 2-pyrrolidone, N,N-dimethylacetamide, N,N-dibutylacetamide or hexamethylphosphoramide as the reaction medium.

The benzothiazolyl dithiocarbamates may be considered a species of thioethers and will be so understood for purposes of this invention. They are important industrial products. For example, 2-benzothiazolyl diethyldithiocarbamate is an important accelerator for the vulcanization of rubber. In preparing these compounds, reaction temperatures below about 100° C. are desirable because the dithiocarbamates decompose at higher temperatures. Satisfactory synthesis from chlorobenzothiazole and sodium diethyldithiocarbamate is desirable for reasons of economy. Although synthesis by this method in alcohol solvents is suggested by Teppema, U.S. Patent 1,838,062, the accelerator obtained is a resinous residue formed together with a yellow oil by-product. The desired product, 2-benzothiazolyl diethyldithiocarbamate, is a solid melting at 82° C.–83° C. The reaction in alcohol succeeds only when a nitro substituent is present on the chlorobenzothiazole.

In the benzothiazolyl dithiocarbamate preparations, the use of DMF improves and simplifies the preparations, and high yields of solid products are obtained. This substitution reaction of the invention is accomplished by reacting a salt of a dithiocarbamic acid with chlorobenzothiazole in a medium of DMF or other di lower alkyl amides of lower fatty acids, dimethylsulfoxide, N-methyl-2-pyrrolidone or hexamethylphosphoramide. Appropriate products obtained from this type reaction are 2-benzothiazolyl diethyldithiocarbamate, 2 - benzothiazolyl-4-morpholinocarbodithioate, 2-benzothiazolyl - 1 - piperidinylcarbodithiate, 2-benzothiazolyl-1-pyrrolidinyl carbodithioate and 2-benzothiazolyl-1-hexahydroazepinylcarbodithioate.

To illustrate this part of my invention, two attempts to synthesize 2-benzothiazolyl diethyldithiocarbamate are described, the first in alcohol as described in U.S. Patent 1,838,062 and the second in DMF. For the alcohol solvent reaction 25.1 grams (0.33 mole) of carbon disulfide is added dropwise at 5° C. to 15° C. to a stirred solution of 24.2 grams (0.33 mole) of diethylamine, 200 ml. of isopropyl alcohol and 52.8 grams (0.33 mole) of 25% aqueous sodium hydroxide. After stirring at 25° C. to 30° C. for one hour, 50.9 grams (0.3 mole) of 2-chlorobenzothiazole is added in one portion. The stirred reaction mixture is heated at 80° C. to 83° C. for three days instead of six hours as described in the patent. After cooling to 5° C., 600 ml. of cold water is added and the mixture is stirred at 0° C. to 10° C. for one hour. During this cooling period no solid results. The reaction mixture is extracted with one liter of ethyl ether. The separated ether solution is washed with water until the washings are neutral to litmus and dried. The ether is removed in vacuo and 61 grams of product, an amber colored oil which does not crystallize on cooling, is obtained. This product contains 17% 2-chlorobenzothiazole based on chlorine analysis.

To prepare 2-benzothiazolyl diethyldithiocarbamate, 38 grams (0.50 mole) of carbon disulfide is added dropwise at 5° C. to 15° C. to a stirred solution containing 36.6 grams (0.5 mole) of diethylamine, 300 ml. of ethyl alcohol, 20 ml. of water and 33 grams (0.5 mole) of 85% potassium hydroxide. After stirring the reaction mixture for one hour, the alcohol and water are removed in vacuo. To the resulting anhydrous potassium diethyl dithiocarbamate, 250 ml. of DMF and 84.8 grams (0.5 mole) of 2-chlorobenzothiazole are added. The stirred reaction mixture is maintained at 80° C. to 90° C. for seven hours and at 25° C. to 30° C. for 18 hours. The reaction mixture is added to 1000 grams of ice water and stirred at 0° C. to 10° C. for one hour. During this period, the oily solid changes to a definite solid. The solid is collected by filtration and washed with water until neutral and dried. The 2-benzothiazoyl diethyldithiocarbamate is obtained in 82.2% yield. A sample of the product melts at 72° C.–74° C. After recrystallization from ethyl alcohol, a sample melts at 82° C.–83° C. A mixture melting point with an authentic sample shows no depression. The infrared spectra of this 2-benzothiazolyl diethyldithiocarbamate and an authentic sample are superimposable. Analysis gives 9.69% nitrogen and 34.27% sulfur as compared to 9.92% nitrogen and 34.06% sulfur calculated for $C_{12}H_{14}N_2S_3$.

To prepare 2-benzothiazolyl diethyldithiocarbamate in a medium of dimethylsulfoxide, the potassium diethyldithiocarbamate is prepared by the same method described supra where DMF is used, but the DMF is replaced with dimethylsulfoxide. To an anhydrous potassium salt, 250 ml. of dimethylsulfoxide and 84.6 grams (0.5 mole) of 2-chlorobenzothiazole are added. The stirred reaction mixture is heated at 80° C. to 95° C. for five hours. After cooling to 25° C., the reaction mixture is added to 2000 grams of ice water and stirred at 0° C. to 10° C. for one hour. The aqueous layer is decanted and 300 ml. of acetone is added to the oily solid. To the resulting solution, 1000 grams of ice water is added and this mixture is stirred at 0° C. to 10° C. for 30 minutes. The solid is collected and the 2-benzothiazolyl diethyldithiocarbamate is obtained in a yield of 55.5%. A sample of the product melts at 68° C.–71° C. A sample of the 2-benzothiazolyl diethyldithiocarbamate recrystallized from ethyl alcohol melts at 82°C.–83° C. A mixture melting point of the recrystallized product with an authentic sample shows no depression. Analysis gives 9.30% nitrogen and 34.17% sulfur as compared to 9.92% nitrogen and 34.06% sulfur calculated for $C_{12}H_{14}N_2S_3$.

To illustrate the preparation of 2-benzothiazolyl diethyldithiocarbamate using the triethylamine salt of diethyldithiocarbamic acid as a reactant in a medium of DMF, 84.6 grams (0.5 mole) of 2-chlorobenzothiazole is added to a stirred solution containing 137.8 grams (0.55 mole) of the triethylamine salt of diethyldithiocarbamic acid in 300 ml. of DMF. The stirred reaction mixture is heated at 80° C. to 90° C. for 24 hours. After cooling to 20° C., the reaction mixture is added to 2000 grams of ice water and stirred for one hour. The solid is collected, washed with water and dried. The product is obtained in 88.6% yield and a sample melts at 77° C.–79° C. After recrystallization from ethyl alcohol, a sample of the 2-benzothiazolyl diethyldithiocarbamate melts at 82° C.–83° C. A mixture melting point of the recrystallized product with an authentic sample shows no depression. Analysis gives 9.81% nitrogen and 34.12% sulfur as compared to 9.92% nitrogen and 34.06% sulfur calculated for $C_{12}H_{14}N_2S_3$.

The following synthesis illustrates the preparation of 2-benzothiazolyl 1-hexahydroazepinylcarbodithioate in DMF. To a stirred solution containing 60 grams (0.6 mole) of hexamethylenimine, 200 ml. of ethyl alcohol, 30 ml. of water and 24.8 grams (0.6 mole) of 97% sodium hydroxide, 45.6 grams (0.6 mole) of carbon disulfide is added dropwise at a temperature of 50° C. to 15° C. After stirring at 25° C. to 30° C. for one hour, 300 ml. of DMF and 84.6 grams (0.5 mole) of 2-chlorobenzothiazole are added to the slurry. The stirred reaction mixture is heated at 80° C. to 90° C. for 18 hours. After cooling to 20° C., the reaction mixture is added to 2000 grams of ice water and stirred at 0° C. to 10° C. for one hour. The solid product is filtered, washed with water and dried. The solid product is obtained in 74.6% yield and a sample melts at 100° C.–103° C. A sample of the 2-benzothiazolyl 1-hexahydroazepinylcarbodithioate recrystallized from ethyl acetate melts at 124° C.–125° C. The infrared spectra of this recrystallized 2-benzothiazolyl 1-hexahydroazepinylcarbodithioate and an authentic recrystallized sample are superimposable. Analysis gives 8.93% nitrogen and 31.23% sulfur as compared to 9.08% nitrogen and 31.18% sulfur calculated for $$C_{14}H_{16}N_2S_3$$

This reaction demonstrates that the improved reaction obtained by using DMF is not affected when solvents, for example ethanol or other alcohols, are present. The synthesis of 2-benzothiazolyl 1-hexahydroazepinylcarbodithioate in DMF is also accomplished by reacting the triethylamine salt of hexahydroazepinylcarbodithioic acid and 2-chlorobenzothiazole. A yield of 89% of the desired product is obtained and a sample melts at 100° C.–105° C. A sample recrystallized from ethyl acetate melts at 124° C.–125° C. Analysis gives 9.07% nitrogen and 31.02% sulfur as compared to 9.08% nitrogen and 31.18% sulfur calculated for $C_{14}H_{16}N_2S_3$.

Comparable results are obtained in preparing benzothiazolyl dithiocarbamates in a medium of dimethylsulfoxide, diethylformamide, dipropylformamide, dibutylformamide, N,N-dimethylbutyramide, N-methyl-2-pyrrolidone, N,N-dimethylacetamide, N,N-dibutylacetamide or hexamethylphosphoramide.

As a general class, paranitrophenylthiothiazoles are effective when used as vulcanization accelerators in rubber chemistry. They are usually prepared from paranitrochlorobenzene or 2,4-dinitrochlorobenzene and mercaptothiazoles or their salts. The reactions of these salts with orthonitrochlorobenzene are sluggish in ethyl alcohol and water solvents. Yields of orthonitrophenylthiothiazoles prepared from orthonitrochlorobenzene in alcohol or water solvents are so low they are negligible. I have discovered by using DMF or other di lower alkyl amides of lower fatty acids, N-methyl-2-pyrrolidone, hexamethylphosphoramide or dimethylsulfoxide as a reaction medium that various salts of mercaptothiazoles react easily with orthonitrochlorobenzene. The orthonitrophenylthiothiazoles obtained when one of these mediums is used are in nearly quantitative yields. These compounds, obviously useful as intermediates, possess significant biological activity.

The invention of the process of synthesizing various nitrophenylthiothiazoles in a medium of DMF or other di lower alkyl amides of lower fatty acids, N-methyl-2-pyrrolidone, hexamethylphosphoramide or dimethylsulfoxide demonstrates an economical route for the preparation of these compounds. To illustrate this part of my invention, the synthesis of 5-chloro-2-(orthonitrophenyl) benzothiazole is described using a solvent of ethyl alcohol, then using DMF. For the alcohol solvent reaction, a stirred mixture containing 50.4 grams (0.25 mole) of 5-chloromercaptobenzothiazole, 16.5 grams (0.25 mole) of 85% potassium hydroxide, 20 ml. of water and 500 ml. of ethyl alcohol is heated to 50° C. To the resulting solution, 39.6 grams (0.25 mole) of orthonitrochlorobenzene is added in one portion and the mixture is stirred and heated at reflux for 24 hours. The reaction mixture is cooled to 10° C. and 400 ml. of water is added. The resulting solid is filtered, washed with water and dried. The yield is a mere 14.8%. A sample of the product, 5- chloro - 2 - (orthonitrophenylthio)benzothiazole, melts at 150° C.–151° C. after recrystallization from heptane. The reaction is repeated in a medium of DMF. To a stirred solution of 300 ml. of DMF, 50.4 grams (0.25 mole) of 5-chloromercaptobenzothiazole and 16.5 grams (0.25 mole) of 85% potassium hydroxide in 20 ml. of water, 39.6 grams (0.25 mole) of orthonitrochlorobenzene is added in one portion. The reaction is heated at 130° C. to 140° C. for 24 hours. After cooling to 25° C., 500 ml. of water is added to the reaction mixture and the precipitate is filtered and dried. By using DMF, a 99% yield of 5-chloro-2-(orthonitrophenylthio)benzothiazole is obtained. A sample of the recrystallized product melts at 150° C.–151° C. Analysis gives 19.96% sulfur and 11.66% chlorine as compared to 19.87% sulfur and 10.98% chlorine calculated for $C_{13}H_7ClN_2O_2S_2$. A 0.50% concentration of 5-chloro-2-(orthonitrophenylthio)benzothiazole shows moderate activity as a contact herbicide against broadleaf plants. The para isomer, 5-chloro-2-(paranitrophenylthio)benzothiazole, shows no toxicity as a herbicide.

The test for foliage contact herbicidal properties of 5-chloro-2-(orthonitrophenylthio)benzothiazole discussed supra, and other nitrochlorobenzene derivatives discussed infra consists of several steps. First, a counted number of seeds of grass, bean and broadleaf plants are planted in standard soil in a flat aluminum pan. The pan used has been perforated on the bottom for proper drainage. The pans of planted seeds are placed in a moist greenhouse bench and allowed to take up water from below as needed. Two weeks after the resulting seedlings emerge they are sprayed with six cubic centimeters of a 0.5% concentration spray of the relevant nitrochlorobenzene derivative. The amount of spray applied to the test area is equivalent to approximately nine pounds per acre. After 14 days, the plants are observed and all injuries noted. The degrees of injury are rated as no phytotoxicity and slight, moderate or severe activity.

To further illustrate the invention of improvements in the preparation of nitrophenylthiothiazoles, 6 ethoxy-2-(orthonitrophenylthio)benzothiazole is described from two preparations, the first preparation in alcohol, the second in DMF. For the alcohol solvent preparation, 52.8 grams (0.25 mole) 6-ethoxy-mercaptobenzothiazole, 500 ml. of ethyl alcohol and 16.5 grams (0.25 mole) 85% potassium hydroxide in 20 ml. of water are stirred at 50° C. To this stirred solution, 39.6 grams (0.25 mole) orthonitrochlorobenzene is added in one portion and heated at reflux for 24 hours. The reaction mixture is cooled to 10° C. and 400 ml. of water is added. The precipitate is collected, washed with water, filtered and dried. The yield is a mere 18.1%. A sample of the 6-ethoxy-2-(orthonitrophenylthio)benzothiazole recrystallized from ethyl acetate melts at 141° C.–143° C. When the identical reaction is repeated in a medium of DMF at a temperature of 120° C. to 130° C. for 24 hours, a yield of 77% 6-ethoxy-2-(orthonitrophenylthio)benzothiazole is obtained. A sample of the product melts at 127° C.–132° C. A sample of the 6-ethoxy-2-(orthonitrophenylthio)benzothiazole recrystallized from ethyl acetate melts at 142° C.–143° C. Analysis gives 19.00% sulfur as compared to 19.29% sulfur calculated for $C_{15}H_{12}N_2O_3S_2$.

To further illustrate the invention, 2-(orthonitrophenylthio)benzothiazole is prepared by adding 39.6 grams (0.25 mole) of orthonitrochlorobenzene in one portion to a stirred solution of 43 grams (0.25 mole) of 97% mercaptobenzothiazole, 300 ml. of DMF and 16.5 grams (0.25 mole) of 85% potassium hydroxide in 20 ml. of water. The reaction is heated at 130° C. to 140° C. for 24 hours. A 99.5% yield of the 2-(orthonitrophenylthio)benzothiazole is obtained and a sample melts at 85° C.–89° C. A sample of the product recrystallized from ethyl alcohol melts at 109° C.–111° C. Analysis gives 22.32% sulfur as compared to 22.24% sulfur calculated for $C_{13}H_8N_2O_2S_2$.

A similar reaction carried out at a temperature of 80° C. to 90° C. for 24 hours yields 83.5% 2-orthonitrophenylthio)benzothiazole and a sample melts at 90° C.–93° C. A sample of this product recrystallized from ethyl alcohol melts at 109° C.–111° C. The reaction is repeated in 225 ml. of dimethylsulfoxide at a temperature between 110° C. and 120° C. for 24 hours. The product is obtained in a 98.2% yield and a sample melts at 104° C.–107° C. A sample of this 2-(orthonitrophenylthio)benzothiazole recrystallized from ethyl alcohol melts at 109° C.–111° C. Analysis gives 9.25% nitrogen and 22.24% sulfur as compared to 9.72% nitrogen and 22.24% sulfur calculated for $C_{13}H_8N_2O_2S_2$. A 0.5% concentration of 2-(orthonitrophenylthio)benzothiazole shows severe activity as a contact herbicide against broadleaf plants. A 0.5% concentration of the para isomer, 2-(paranitrophenylthio)benzothiazole, shows no toxicity as a herbicide.

To illustrate the synthesis of 2-(orthonitrophenylthio)-6-aminobenzothiazole, the mercaptobenzothiazole of the reaction described supra is replaced with 45.6 grams (0.25 mole) of 6-aminomercaptobenzothiazole. A yield of 99% 2-(orthonitrophenylthio)6-aminobenzothiazole is obtained and a sample melts at 140° C.–150° C. A sample of the product recrystallized from ethyl acetate melts at 173° C.–174° C. Analysis gives 21.09% sulfur as compared to 21.14% sulfur calculated for $C_{13}H_9N_3O_2S_2$.

Replacement of mercaptobenzothiazole with 53.6 grams (0.25 mole) 6-nitro-2-mercaptobenzothiazole yields 57.7% 6-nitro-2-(orthonitrophenylthio)benzothiazole. A sample of the product recrystallized from ethyl alcohol melts at 210° C.–212° C. Analysis gives 19.90% sulfur as compared to 19.24% sulfur calculated for $C_{13}H_7N_3O_4S_2$. A 0.5% concentration of 6-nitro-2-(orthonitrophenylthio)benzothiazole shows severe activity against broadleaf plants and moderate activity against grass plants when it is used as a contact herbicide. The isomer 2-(2,4-dinitrophenylthio)-benzothiazole was tested as a herbicide but no useful properties were developed in this area. 6-nitro-2-(orthonitrophenylthio)benzothiazole shows insecticidal properties against house flies and against the larvae of the southern armyworm, *Prodenia eridania*. Fungicide tests show this product to be toxic to Pythium.

Replacement of mercaptobenzothiazole with 37.6 grams (0.25 mole) 2-mercapto benzomidazole yields 88.7% 2-(orthonitrophenylthio)benzimidazole. A sample of this product melts at 202° C.–208° C. A sample of the product recrystallized from ethyl alcohol melts at 213°–215° C. Analysis gives 11.69% sulfur as compared to 11.82% sulfur calculated for $C_{13}H_9N_3O_2S$. A 0.5% concentration of 2-(orthonitrophenylthio)benzimidazole shows noticeable toxicity to the foliage of narrow and broadleaf plants. A 0.5% concentration of the para isomer, 2-(paranitrophenylthio)benzimidazole shows no toxicity as a herbicide.

Replacement of mercaptobenzothiazole with 37.8 grams (0.25 mole) 2-mercaptobenzoxazole yields 73% 2-(orthonitrophenylthio)benzoxazole semi-solid. Analysis gives 10.95% sulfur as compared to 11.77% sulfur calculated for $C_{13}H_8N_2O_3S$. This compound is innocuous to plants.

Replacement of mercaptobenzothiazole with 43.6 grams (0.25 mole) 2-mercapto-4-methyl-5-thiazolecarboxamide yields 97.2% 4-methyl-2-(orthonitrophenylthio)-5-thiazolecarboxamide. A sample of this product melts at 150° C.–152° C. A sample of the product recrystallized from ethyl alcohol melts at 155° C.–156° C. Analysis gives 21.32% sulfur as compared to 21.71% sulfur calculated for $C_{11}H_9N_3O_3S_2$.

Replacement of mercaptobenzothiazole with 34 grams (0.196 mole) 2-mercapto-5-acetyl-4-methylthiazole with similar mole ratio adjustments to (0.196 mole) of the 85% potassium hydroxide and orthonitrochlorobenzene yields 88.5% 2-(orthonitrophenylthio)-5-acetyl-4-methylthiazole. A sample of this products melts at 90° C.–100° C. A sample of the product recrystallized from ethyl acetate melts at 112° C.–113° C. Analysis gives 21.78% sulfur as compared to 21.79% sulfur calculated for $C_{12}H_{10}N_2O_3S_2$. 2-(orthonitrophenylthio)-5-acetyl-4-methylthiazole is an active insecticide against house flies and against the yellow mosquito larvae and shows fungicidal properties against Pythium.

Replacement of mercaptobenzothiazole with methyl 2-mercapto-4-methyl-5-thiazolecarboxylate yields 76.1% semi-solid methyl 2-(orthonitrophenylthio)-4-methyl-5-thiazole-carboxylate. This product shows insecticidal properties against house flies and against the yellow fever-mosquito larvae.

Replacement of mercaptobenzothiazole with ethyl 2-mercapto-4-methyl-5-thiazolecarboxylate yields ethyl-4-methyl - 2 - (orthonitrophenylthio)-5-thiazolecarboxylate. A sample of this product melts at 95° C.–97° C. A sample of the product recrystallized from ethyl alcohol melts at 103° C.–105° C. Analysis gives 18.83% sulfur and 9.70% nitrogen as compared to 19.77% sulfur and 8.64% nitrogen calculated for $C_{13}H_{12}N_2O_4S_2$. A 0.5% concentration of ethyl - 4 - methyl-2-(orthonitrophenylthio)-5-thiazolecarboxylate shows severe activity as a contact herbicide against broadleaf plants. The product is an active insecticide against house flies and against the yellow fever-mosquito larvae.

Results comparable to the preparations in DMF and dimethylsulfoxide are obtained in preparing orthonitrophenylthiothiazoles in a medium of N,N-dimethylbutyramide, N-methyl-2-pyrrolidone, N,N-dimethylacetamide, N,N-dibutylacetamide, diethylformamide, dipropyl formamide, dibutyl formamide or hexamethylphosphoramide.

It is intended to cover all modifications of examples chosen for purposes of disclosure which do not constitute departure from the spirit and scope of the invention.

What is claimed is:
1. In a process for the substitution reaction wherein a salt of a dithiocarbamic acid having the formula (1)

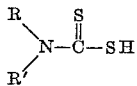

where R and R' are selected from the group consisting of lower alkyl and radicals which with the nitrogen constitute a heterocyclic ring selected from the group consisting of morpholino, 1-pyrrolidinyl, piperidino and 1-hexahydroazepinyl is reacted with a halogen compound having the formula (2)

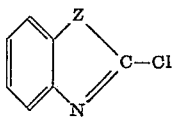

where Z is selected from the group consisting of S, NH, and O: the step comprising carrying out the reaction and forming a dithiocarbamate in a medium selected from the group consisting of di lower alkyl amides of lower fatty acids, N-methyl-2-pyrrolidone, hexamethylphosphoramide and dimethylsulfoxide.

2. In a process for the substitution reaction wherein a salt of a dithiocarbamic acid which dithiocarbamic acid has the formula

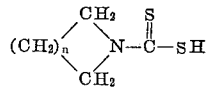

where $n$ is an integer at least 2 but less than 5, is reacted with 2-chlorobenzothiazole, the step comprising carrying out the reaction and forming thioether in a medium selected from the group consisting of di lower alkyl amides of lower fatty acids, N-methyl-2-pyrrolidone, hexamethylphosphoramide and dimethylsulfoxide at a temperature below the decomposition temperature of the dithiocarbamate.

3. The process of claim 1 wherein the halogen compound is 2-chlorobenzothiazole and the salt is a salt of a dithiocarbamic acid of formula

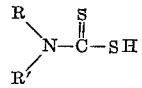

where R and R' are lower alkyl.

4. In a process for preparing benzothiazolyl diethyldithiocarbamate by reacting sodium diethyldithiocarbamate and 2-chlorobenzothiazole, the step comprising carrying out the reaction and forming benzothiazolyl diethyldithiocarbamate in a medium selected from the group consisting of di lower alkyl amides of lower fatty acids N-methyl-2-pyrrolidone, hexamethylphosphoramide and dimethylsulfoxide at a temperature below the decomposition temperature of the dithiocarbamate.

5. In a process for preparing benzothiazolyl diethyldithiocarbamate by reacting sodium diethyldithiocarbamate and 2-chlorobenzothiazole, the step comprising carrying out the reaction and forming benzothiazolyl diethyldithiocarbamate in a medium of dimethylformamide at a temperature below the decomposition temperature of the dithiocarbamate.

References Cited
UNITED STATES PATENTS
2,054,453    9/1936    Teppema _____ 260—306.6

OTHER REFERENCES
Parker, Quarterly Reviews, vol. 16, pages 176–182 and 187 (1962).

ALTON D. ROLLINS, *Primary Examiner.*
ALEX MAZEL, *Examiner.*